United States Patent
Woo et al.

(10) Patent No.: US 10,464,437 B2
(45) Date of Patent: Nov. 5, 2019

(54) COOLING CONTROL METHOD FOR BATTERY MANAGEMENT SYSTEM IN ELECTRIC VEHICLE

(71) Applicants: HYUNDAI MOTOR COMPANY, Seoul (KR); KIA MOTORS CORPORATION, Seoul (KR)

(72) Inventors: Jung Je Woo, Goyang-si (KR); Woo Jin Shin, Seoul (KR); Suk Hyung Kim, Gunpo-si (KR); Jae Hoon Choi, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/838,951

(22) Filed: Dec. 12, 2017

(65) Prior Publication Data

US 2018/0326862 A1 Nov. 15, 2018

(30) Foreign Application Priority Data

Dec. 13, 2016 (KR) .................. 10-2016-0169992

(51) Int. Cl.
*B60H 1/00* (2006.01)
*B60L 11/18* (2006.01)
(Continued)

(52) U.S. Cl.
CPC ...... *B60L 11/1874* (2013.01); *B60H 1/00278* (2013.01); *B60L 1/003* (2013.01); *B60L 58/16* (2019.02); *B60L 58/26* (2019.02); *H01M 10/486* (2013.01); *H01M 10/613* (2015.04); *H01M 10/625* (2015.04); *H01M 10/63* (2015.04); *H01M 10/6563* (2015.04); *B60K 6/28* (2013.01); *B60L 2240/545* (2013.01);
(Continued)

(58) Field of Classification Search
CPC ........... B60L 11/1857; B60L 2240/545; B60L 11/1874; B60H 1/00278; H01M 10/613; H01M 10/60; H01M 10/625; H01M 10/63; H01M 10/6563; H01M 2220/20; B60K 6/28; Y02T 10/7005
See application file for complete search history.

(56) References Cited

U.S. PATENT DOCUMENTS

2013/0076313 A1* 3/2013 Kim ...................... H02J 7/047
320/150

FOREIGN PATENT DOCUMENTS

KR 20130017286 A 2/2013

* cited by examiner

*Primary Examiner* — Henry T Crenshaw
*Assistant Examiner* — Kamran Tavakoldavani
(74) *Attorney, Agent, or Firm* — McDonnell Boehnen Hulbert & Berghoff LLP

(57) ABSTRACT

Disclosed herein is a cooling control method for a battery management system in a vehicle in which battery cooling is controlled by according to the degree of battery durability deterioration.

Specifically, the method of controlling battery cooling using a battery management system (BMS) configured to control a degree of cooling fan operation based on a battery temperature in the vehicle equipped with the battery and the cooling fan, includes the steps of increasing the degree of cooling fan operation compared normal conditions when an actual battery durability deterioration rate (Vt) measured using battery durability deterioration degree information during vehicle operation is higher than a predicted battery durability deterioration rate.

5 Claims, 3 Drawing Sheets

(51) Int. Cl.
    *H01M 10/613*    (2014.01)
    *H01M 10/63*     (2014.01)
    *H01M 10/625*    (2014.01)
    *H01M 10/6563*   (2014.01)
    *B60L 58/16*     (2019.01)
    *B60L 58/26*     (2019.01)
    *H01M 10/48*     (2006.01)
    *B60L 1/00*      (2006.01)
    *B60K 6/28*      (2007.10)

(52) U.S. Cl.
    CPC ....... *B60L 2260/50* (2013.01); *B60Y 2200/91* (2013.01); *B60Y 2200/92* (2013.01); *H01M 2220/20* (2013.01); *Y02T 10/7005* (2013.01)

COOLING CONTROL METHOD FOR BATTERY MANAGEMENT SYSTEM IN ELECTRIC VEHICLE

CROSS-REFERENCE TO RELATED APPLICATION

This application claims priority to and benefit of Korean Patent Application No. 10-2016-0169992, filed on Dec. 13, 2016 in the Korean Intellectual Property Office, the disclosure of which is incorporated herein by reference.

BACKGROUND

1. Technical Field

The present disclosure relates to a cooling control method for a battery management system in an electric vehicle, and more particularly, to a cooling control method for a battery management system in an electric vehicle in which cooling of a battery is controlled based on a rate of deterioration of the battery.

2. Description of the Related Art

As interest in environmental pollution and carbon dioxide emissions intensifies, there is increasing interest in environmentally-friendly vehicles that generate less pollution than conventional fossil-fueled internal combustion engine vehicles. Environmentally-friendly vehicles include a hybrid electric vehicle (HEV) that generates power using an internal combustion engine and an electric motor, and an electric vehicle (EV) that runs only by the power of the electric motor.

The electric motor generates power using electric energy from a battery. Typically, a high-voltage battery is used for the motor, and is formed by configuring a module with a plurality of battery cells, connecting a plurality of modules and mounting the modules in a case.

A number of electrical parts are provided inside the battery case, and substantial heat is generated during operation of the electrical parts due to chemical reaction inside the battery cells. If the generated heat is continuously accumulated in the battery, the service life of the battery is shortened. Therefore, a separate device for cooling the battery is required.

The device for cooling the battery is controlled by a battery management system (BMS). For example, a battery and a cooling fan for cooling the battery with air are provided, and the degree of operation of the cooling fan is controlled by the BMS to adjust the amount of air supplied to the battery.

A conventional BMS measures the temperature of the battery from which heat is generated and controls the degree of operation of the cooling fan according to the measured temperature to cool the battery. Specifically, a control mode specifying the degree of operation of the cooling fan for each temperature range is set according to the temperature of the battery, and then the temperature of the battery during operation of the vehicle is measured. Operation of the cooling fan is controlled based on the measured temperature range.

However, when durability of the battery decreases below an expected durability of the battery due to variables such as the storage temperature, the driving habits of the driver, and the charging condition, a desired cooling level of the battery cannot be achieved even if the cooling fan is operated according to a preset control mode. In this case, the service life of the battery is further shortened.

It should be understood that the foregoing description of the background art is merely for the purpose of promoting an understanding of the background of the present disclosure and is not to be construed as admitting that the present disclosure corresponds to the prior art known to those skilled in the art.

SUMMARY OF THE DISCLOSURE

The present disclosure addresses the above problems by providing a cooling control method for a battery management system in an electric vehicle, which controls battery cooling based on a measured battery temperature of the battery and an assessment of the deterioration in durability of the battery.

In accordance with an example embodiment of the present disclosure, the above and other objects can be accomplished by providing a method of controlling battery cooling using a battery management system (BMS) configured to control operation of a cooling fan based on a measured battery temperature in an electric vehicle equipped with the battery and the cooling fan, the method including increasing the degree of cooling fan operation compared to cooling fan operation under normal conditions when an actual battery durability deterioration rate (Vt) measured using battery durability deterioration degree information during operation of the vehicle is higher than a predicted battery durability deterioration rate (Vp).

In accordance with another embodiment of the present disclosure, the above and other objects can be accomplished by providing a method of controlling battery cooling using a battery management system (BMS) configured to control operation of a cooling fan based on a measured battery temperature in an electric or hybrid vehicle equipped with the battery and the cooling fan, the method including the steps of: setting a normal mode (M1) for controlling the degree of cooling fan operation based on battery temperature in a normal operation environment; setting a deterioration attenuation mode (M2) for increasing the degree of cooling fan operation above normal mode (M1) based on battery temperature; setting a predicted battery durability deterioration rate (Vp); monitoring actual battery durability deterioration rate using battery durability deterioration degree information during operation of the vehicle; controlling operation of the battery and the cooling fan in the normal mode (M1) when a monitored actual battery durability deterioration rate (Vt) is lower than or equal to the predicted battery durability deterioration rate (Vp); and controlling the operation of the battery and the cooling fan in the deterioration attenuation mode (M2) when the monitored actual battery durability deterioration rate (Vt) is higher than the predicted battery durability deterioration rate (Vp).

In a further example embodiment, the step of setting the deterioration attenuation mode (M2) may include setting a first deterioration attenuation mode (M2-1) for increasing the degree of cooling fan operation above the normal mode (M1) based on the battery temperature, and a second deterioration attenuation mode (M2-2) for increasing the degree of cooling fan operation of the cooling fan above the first deterioration attenuation mode (M2-1).

In a further example embodiment, the step of setting the deterioration attenuation mode (M2) may include setting a reference value (Vc) for a difference ($\Delta V$) between the monitored actual battery durability deterioration rate (Vt) and the predicted battery durability deterioration rate (Vp).

In a further example embodiment, the step of controlling cooling fan operation in the deterioration attenuation mode (M2) may include operating the cooling fan in the first deterioration attenuation mode (M2-1) when the difference (ΔV) between the monitored actual battery durability deterioration rate (Vt) and the predicted battery durability deterioration rate (Vp) is less than or equal to the set reference value (Vc), and operating the cooling fan in the second deterioration attenuation mode (M2-2) when the difference (ΔT) is greater than the set reference value (Vc).

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Reference will now be made in detail to various example embodiments of a method for cooling a vehicle battery, as illustrated in the accompanying drawings. It will be apparent to those skilled in the art that the present disclosure is not limited to the example embodiments disclosed herein but may be embodied in many different forms. Wherever possible, the same reference numbers will be used throughout the drawings to refer to the same or like parts.

The present disclosure is directed to a method of controlling battery cooling using a battery management system (BMS) that controls the degree of cooling fan operation based on the battery temperature in an electric vehicle equipped with the battery and the cooling fan. However, application of the present disclosure is not limited to electric vehicles but also may be applied to control of cooling of various batteries mounted in vehicles. For example, the present invention may be applied to a battery mounted in a hybrid electric vehicle (HEV).

Figure 1:
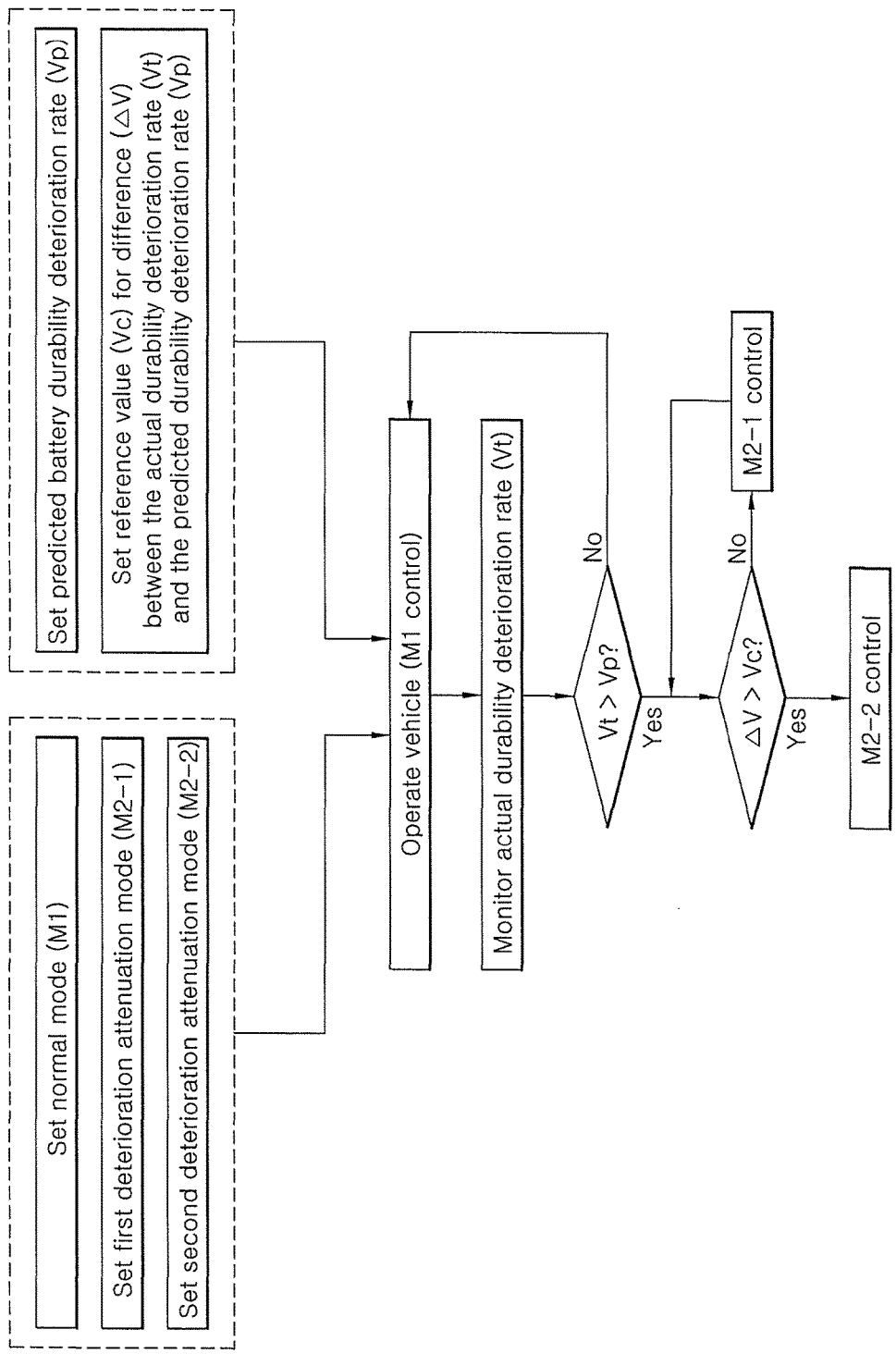
FIG. 1 is a flowchart illustrating a cooling control method for a battery management system in an electric vehicle according to an example embodiment of the present disclosure.

FIG. 1 is a flowchart illustrating a cooling control method for a battery management system in an electric vehicle according to an example embodiment.

In the cooling control method for a BMS in an electric vehicle according to the example embodiment, the degree of cooling fan operation is increased compared to the degree of cooling fan operation applied under normal conditions when an actual battery durability deterioration rate Vt measured using battery durability deterioration information during vehicle operation is higher than a predicted batter durability deterioration rate Vp.

Hereinafter, the cooling control method for the BMS in an electric vehicle according to an embodiment of the present invention is described in detail.

As shown in FIG. 1, in order to control battery cooling, a normal mode M1 for controlling the degree of cooling fan operation based on battery temperature in a normal operating environment is set. The degree of cooling fan operation is indicated by a stage index. For example, normal mode M1 can be set as shown in Table 1 below.

Next, a deterioration attenuation mode M2 in which the degree of cooling operation of is increased above the normal mode M1 based on battery temperature is set.

In an example embodiment, the set deterioration attenuation mode M2 include a first deterioration attenuation mode M2-1, in which the degree of cooling fan operation is increased above the normal mode M1 based on battery temperature, and a second deterioration attenuation mode M2-2, in which the degree of cooling fan operation is increased above first deterioration attenuation mode M2-1. For example, first deterioration attenuation mode M2-1 and second deterioration attenuation mode M2-2 can be set as shown in Table 1 below.

TABLE 1

| Normal mode (M1) | | First deterioration attenuation mode (M2-1) | | Second deterioration attenuation mode (M2-2) | |
|---|---|---|---|---|---|
| Battery temperature (° C.) | Cooling fan stage | Battery temperature (° C.) | Cooling fan stage | Battery temperature (° C.) | Cooling fan stage |
| 30 | 2 | 30 | 5 | 30 | 9 |
| 40 | 5 | 40 | 7 | 40 | 9 |
| 50 | 7 | 50 | 8 | 50 | 9 |
| 60 | 9 | 60 | 9 | 60 | 9 |

A reference value Vc for dividing deterioration attenuation mode M2 into first deterioration attenuation mode M2-1 and second deterioration attenuation mode M2-2 is set by the operator according to the degree of battery durability deterioration. Any reference value Vc may be set through various variables such as the capacity of the battery.

Next, a predicted battery durability deterioration rate Vp is set.

In a preferred embodiment, the predicted battery durability deterioration rate Vp is set to increase in proportion to the travel distance. However, the predicted battery durability deterioration rate Vp is a theoretical expected value without considering abnormal parameters.

After the attenuation modes, the reference value and the deterioration rates have been set, the cooling control method for the BMS is applied while the vehicle is running.

When the vehicle is started, battery cooling is controlled according to the normal mode M1.

While the battery cooling is controlled in the normal mode M1, the battery durability deterioration rate is monitored in real time using the battery durability deterioration information. Battery durability deterioration rate can be monitored using various methods. For example, the capacity (voltage) of the battery can be measured in real time, and the durability deterioration rate can be calculated in accordance with the amount of change in capacity.

Once the battery durability deterioration rate is calculated, battery and cooling fan operation continues to be controlled in the normal mode M1 if the monitored actual battery durability deterioration rate Vt is lower than or equal to the predicted battery durability deterioration rate Vp.

If the actual battery durability deterioration rate Vt measured is higher than the predicted battery durability deterioration rate Vp due to an increase in travel distance of the vehicle, battery and cooling fan operation are controlled in the deterioration attenuation mode M2.

Specifically, if the difference ΔV between the actual battery durability deterioration rate Vt monitored during control of the cooling fan in the normal mode M1 and the predicted battery durability deterioration rate Vp is less than or equal to a set reference value Vc, the cooling fan is operated in the first deterioration attenuation mode M2-1.

If the difference ΔV between the actual deterioration rate Vt monitored during control of the cooling fan in the first deterioration attenuation mode M2-1 and the predicted battery durability deterioration rate Vp is smaller than the set reference value Vc, the cooling fan is operated in the second deterioration attenuation mode M2-2.

Next, the control method checks whether the battery guaranteed distance can be expected to be ensured by controlling the cooling fan according to the cooling control method for the BMS in an electric vehicle.

Figure 2:
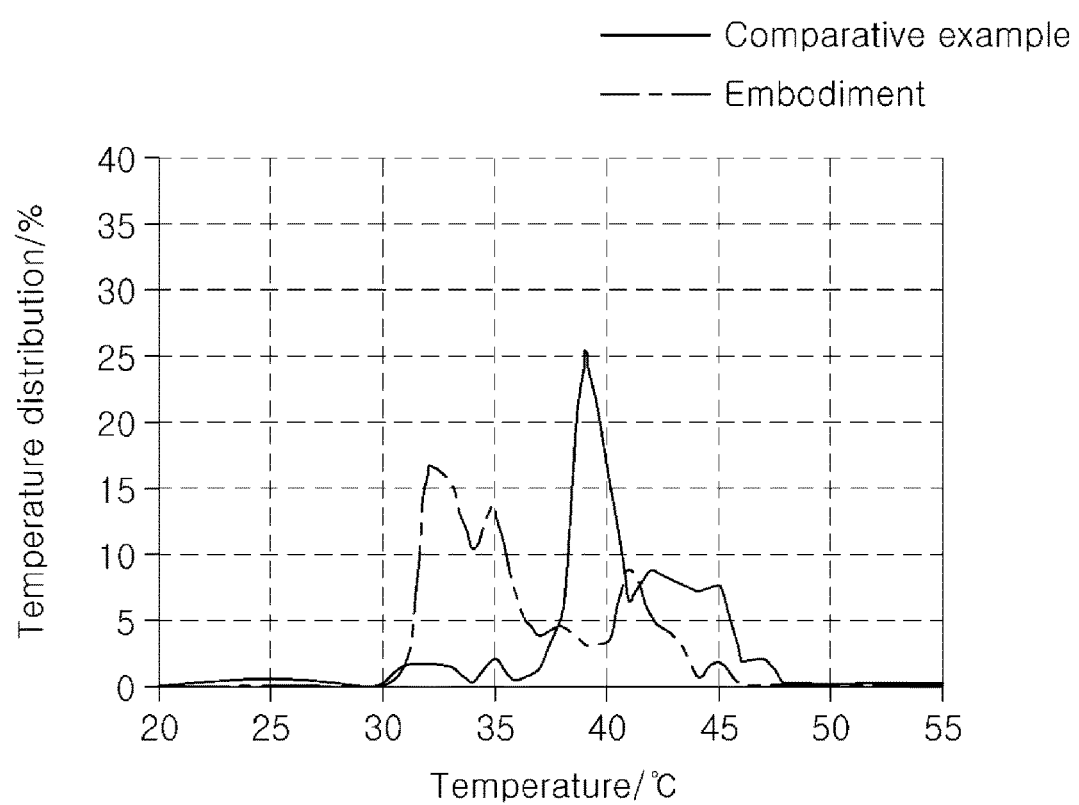
FIG. 2 is a graph depicting change in battery temperature of a battery based on a cooling condition of a battery.

FIG. 2 is a graph depicting the change in battery temperature based on a cooling condition of the battery, wherein the comparative example illustrates control of the cooling fan in the normal mode M1 during vehicle operation, and the embodiment illustrates control of the cooling fan in the deterioration attenuation mode M2 during vehicle operation.

As can be seen from FIG. 2, the battery temperature distribution using the example embodiment is shifted to a lower temperature range than in the comparative example, and as a result, durability of the battery is improved using the example embodiment by about 10%.

Accordingly, the result confirms that the rate of battery deterioration can be controlled by adjusting the degree of battery cooling in accordance with the example embodiments described above.

Figure 3:
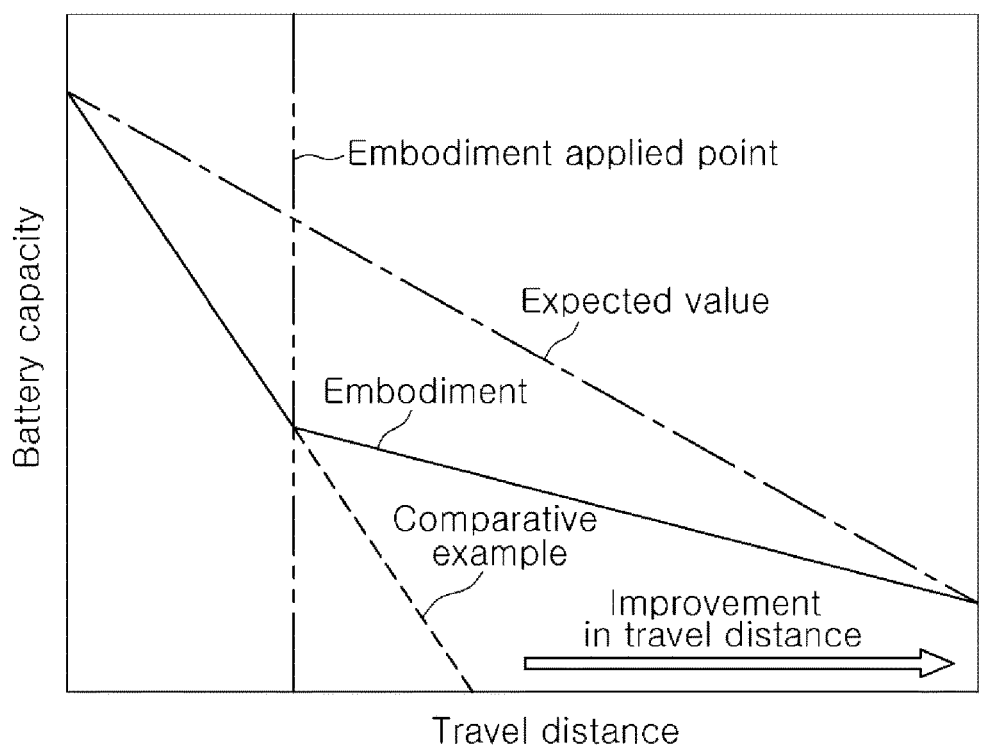
FIG. 3 is a graph depicting improvements in travel distance that can be expected when a cooling control method for a battery management system in an electric vehicle according to an example embodiment of the present disclosure is used.

FIG. 3 is a graph depicting improvements in travel distance that can be expected when a cooling control method for a battery management system in an electric vehicle according to an example embodiment is used.

In FIG. 3, the expected value line represents a theoretical case in which any abnormal parameter that may change the capacity of the battery is not considered. The comparative example illustrates control of the cooling fan in the normal mode M1 during vehicle operation, and the example embodiment illustrates control of the cooling fan in the deterioration attenuation mode M2 during vehicle operation.

As can be seen from FIG. 3, in the comparative example, the capacity of the battery is significantly reduced as travel distance increases, compared to the expected value. Therefore, it can be predicted that the battery guaranteed distance cannot be ensured when the cooling fan is controlled in the normal mode M1 alone.

Using the example embodiment, on the other hand, the decrease in the battery capacity is greatly attenuated compared to the comparative example. Therefore, it is expected that decrease in the battery capacity will be attenuated and the guaranteed distance of the battery can be ensured when the cooling fan is controlled in the deterioration attenuation mode M2.

As is apparent from the above description, according to embodiments of the present disclosure, in controlling battery cooling, the degree of cooling fan operation is adjusted by using the real-time measured battery temperature and an assessment of the rate of deterioration in battery durability. Thereby, the service life of the battery may be improved.

Although example embodiments of the present disclosure have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling battery cooling using a battery management system configured to control a degree of cooling fan operation based on a battery temperature in a vehicle equipped with the battery and the cooling fan, the method comprising:
   increasing the degree of cooling fan operation above a degree of cooling fan operation under normal conditions when an actual battery durability deterioration rate measured using battery durability deterioration degree information during vehicle operation is higher than a predicted battery durability deterioration rate;
   wherein the actual battery durability deterioration rate is a value calculated in accordance with the amount of change in capacity while capacity of the battery is measured in real time; and
   wherein the battery durability deterioration degree information is decided on the basis of a lifespan of the battery, reflecting a travel distance of a vehicle.

2. A method of controlling battery cooling using a battery management system configured to control a degree of cooling fan operation based on a battery temperature in a vehicle equipped with the battery and the cooling fan, the method comprising:
   setting a normal mode for controlling the degree of cooling fan operation based on the battery temperature in a normal operation environment;
   setting a deterioration attenuation mode for increasing the degree of cooling fan operation above the normal mode based on the battery temperature;
   setting a predicted battery durability deterioration rate;
   monitoring an actual battery durability deterioration rate using battery durability deterioration degree information during vehicle operation;
   controlling battery and cooling fan operation in the normal mode when the monitored actual battery durability deterioration rate is lower than or equal to the predicted battery durability deterioration rate; and
   controlling battery and cooling fan operation in the deterioration attenuation mode when the monitored actual battery durability deterioration rate is higher than the predicted battery durability deterioration rate;
   wherein the actual battery durability deterioration rate is a value calculated in accordance with the amount of change in capacity while capacity of the battery is measured in real time; and
   wherein the battery durability deterioration degree information is decided on the basis of a lifespan of the battery, reflecting a travel distance of a vehicle.

3. The method of claim 2, wherein the step of setting the deterioration attenuation mode comprises:
   setting a first deterioration attenuation mode for increasing the degree of cooling fan operation above the normal mode based on the battery temperature, and
   setting a second deterioration attenuation mode for increasing the degree of cooling fan operation above the first deterioration attenuation mode.

4. The method of claim 3, wherein the step of setting the deterioration attenuation mode comprises:
   setting a reference value for a difference between the monitored actual battery durability deterioration rate and the predicted battery durability deterioration rate.

5. The method of claim 4, wherein the step of controlling in the deterioration attenuation mode comprises:
   operating the cooling fan in the first deterioration attenuation mode when the difference between the monitored actual battery durability deterioration rate and the predicted battery durability deterioration rate is less than or equal to the set reference value; and operating the cooling fan in the second deterioration attenuation mode when the difference between the monitored actual battery durability deterioration rate and the predicted battery durability deterioration rate is greater than the set reference value.

\* \* \* \* \*